March 31, 1970 P. W. VANDERHELST 3,504,157
SLOPE CONTROL FOR RESISTANCE WELDING
Filed May 25, 1966 6 Sheets-Sheet 4

INVENTOR
PETER W. VANDERHELST
BY
Woodhams, Blanchard & Flynn
ATTORNEYS

INVENTOR
PETER W. VANDERHELST
BY
Woodhams, Blanchard & Flynn
ATTORNEYS

March 31, 1970 P. W. VANDERHELST 3,504,157
SLOPE CONTROL FOR RESISTANCE WELDING
Filed May 25, 1966 6 Sheets-Sheet 6

INVENTOR
PETER W. VANDERHELST
BY
Woodhams, Blanchard & Flynn
ATTORNEYS 3,504,157
SLOPE CONTROL FOR RESISTANCE WELDING
Peter W. Vanderhelst, Livonia, Mich., assignor to
Robotron Corporation, Detroit, Mich., a corporation of Michigan
Filed May 25, 1966, Ser. No. 552,943
Int. Cl. B23k 11/24
U.S. Cl. 219—110                                    25 Claims

ABSTRACT OF THE DISCLOSURE

A method and apparatus for changing at a linear rate the weld heat applied to a workpiece. A first linear ramp signal is generated. A second linear ramp signal opposite in polarity of slope from the first ramp signal is generated from the first ramp signal. The first and second ramp signals are added to provide a sloped linear reference signal. The weld heat is made to follow the reference signal.

---

This invention relates to a method and apparatus for producing a slope signal and more particularly relates to a method and apparatus capable of alternatively producing a rise or fall in the peak amplitude envelope of an electrical waveform between fixed amplitude and time end points in which the rate of change of envelope amplitude is linear with respect to time.

The method and apparatus embodying the present invention were particularly developed for use with resistance welding apparatus and will be discussed in terms of such use hereinbelow for purposes of illustration. However, it will be recognized that the method and circuit embodying the invention may be used in resistance welding apparatus in a variety of ways other than that shown and in other applications as well. The present invention in its broadest sense is thus not limited to a resistance welding application. In the present discussion, the term envelope is used for convenience in reference to describe a line defined by the peak amplitude points of an alternating waveform, e.g., the weld current waveform.

It has been common practice in resistance welding heretofore to increase or decrease the peak amplitude of the welding current waveform over a period of several cycles. For example, it is quite common to increase from a low value, the peak amplitude of the welding current over a number of cycles until a preselected maximum amplitude is achieved, furnishing a further plurality of cycles of welding current at this maximum amplitude and then causing the peak amplitude of the current waveform to gradually drop over several cycles to a lower value thereby producing an envelope having an initial upslope, a constant high mid-portion and a final downslope. In some cases, it may be desired to provide an envelope having an initial downslope, an intermediate constant portion and a final up or downslope. As indicate by the NEMA handbook, it has been customary in the past to specify the amplitude and time coordinates of the beginning and end points of the sloped portions of the weld current peak envelope. However, it has not been customary in the past to specify the shape of such a sloped portion, i.e., the precise path over which the weld current peak amplitude varies between the specified amplitude-time points. More precisely, it has not in the past been customary to specify that such a sloped portion be a straight line. On the contrary, it has been common practice to use simple RC circuits to determine the sloped portions of the weld current peak envelope and as a result exponentially shaped rather than linear sloped portions have been the rule. Such exponential slopes, however, are generaly asymptotic to either the preceding or succeeding constant envelope amplitude portions. This is undesirable since there is no discernable change in slope at the joint of sloped and constant amplitude portions of the envelope, and as a result the number of cycles in the sloped and constant amplitude portions cannot be precisely determined.

Prior circuits are also known which can provide a linear slope if one of the time and amplitude coordinates of the slope end points is not fixed. Such a circuit can provide a linear slope from a starting point of fixed time and amplitude to an end value of amplitude if the end time need not be settable with precision.

As a result, it is an object of this invention to provide a method and apparatus for producing a slope signal in which the slope is linear, may readily be made either positive or negative and has end points with precisely known time and amplitude coordinates.

A further object is to provide a method and apparatus, as aforesaid, capable of alternatively producing a rise and fall in the peak amplitude envelope of an alternating electrical waveform in which envelope slope is linear with respect to time and extends between fixed amplitude and time end points and corresponds to the slope signal generated.

A further object is to provide a method and apparatus, as aforesaid, by means of which the slope of the slope signal may be continuously varied between preselected maximum positive and negative values through zero without loss of linearity and in which the slope of the sloped portion of the envelope varies with that of the slope signal.

A further object is to provide a method and apparatus, as aforesaid, in which the amplitude and time components of the slope end points can be readily adjusted in a continuous manner over a relatively wide range and in which the time components of the end points can be located precisely, each at a preselected point in phase on a preselected cycle of the alternating waveform.

A further object is to provide a method and apparatus, as aforesaid, in which the change in slope between a sloped portion and a constant amplitude portion of the waveform envelope is sharp and well defined and in which the number of cycles of the alternating waveform in the constant amplitude and slope portions of the envelope can be precisely determined.

A further object is to provide a method and apparatus, as aforesaid, which is capable of producing an output envelope having a sloped initial part, a constant amplitude intermediate part and a sloped final part, which is particularly adapted for controlling the shape of the envelope defined by a welding current waveform and which is capable of use with welding current waveforms which are continuous throughout the length of the envelope or which comprise a series of alternating current bursts spaced by zero current intervals.

A further object is to provide a method and apparatus, as aforesaid, which is capable of controlling a variety of known types of weld-current heat control units and which may be used, for example, to directly control heat control units or to generate a reference voltage in feedback-comparison type of heat control units.

A further object is to provide a method, as aforesaid, which is capable of practice with relatively simple circuitry employing known and widely available components and capable of a long trouble-free operating life with little or no maintenance and which can be mass produced at a relatively low cost.

Further objects and purposes of this invention will be apparent to persons acquainted with apparatus of this general type upon reading the following description and inspecting the accompanying drawings.

GENERAL DESCRIPTION

In general, the objects and purposes of this invention are met by providing a method comprising generating a positively sloped ramp signal and a negatively sloped ramp signal, the time coordinates of the beginning and end points of which are identical. Preselected amplitude fractions of the positive going and negative going ramp signals are then added together to produce a reference or slope signal of linear slope the end points of which have time coordinates corresponding to those of the fractional ramp signals. The amplitude of the initial point of the reference signal thus is equal to the sum of the amplitudes of the initial point of the fractional ramp signals and the amplitude of the final point of the reference signal thus is equal to the sum of the amplitudes of the final points of the fractional ramp signals.

The method embodying the invention is preferably carried out with apparatus including a capacitor chargeable by a constant current source from a predetermined initial state over a predetermined time period, the rate of charging being precisely determined by adjustable current limiting resistances connected to the constant current source. Amplitude limiting means are provided to limit the final charge on the capacitor. Buffering means connected to the capacitor produce one of the ramp signals, for example, the positive going ramp signal. A phase inverting operational amplifier fed with the first ramp signal inverts the phase thereof for producing the second, i.e., negative, ramp signal. The positive going and negative going ramp signals are applied to corresponding amplitude adjusting potentiometers by means of which predetermined fractions of the instantaneous amplitude, and hence, slope of the ramp signals may be selected. The resulting fractional ramp signals are then fed to the input of an operational amplifier summing circuit which produces the reference signal as its output. Means are preferably provided for initiating the ramp signals and for selecting the desired duration, and thereby slope thereof as well as for applying the desired ones of said amplitude adjusting potentiometers. In addition, means are preferably provided for producing a welding current envelope corresponding to the shape of the reference signal.

DETAILED DESCRIPTION

Figure 1:
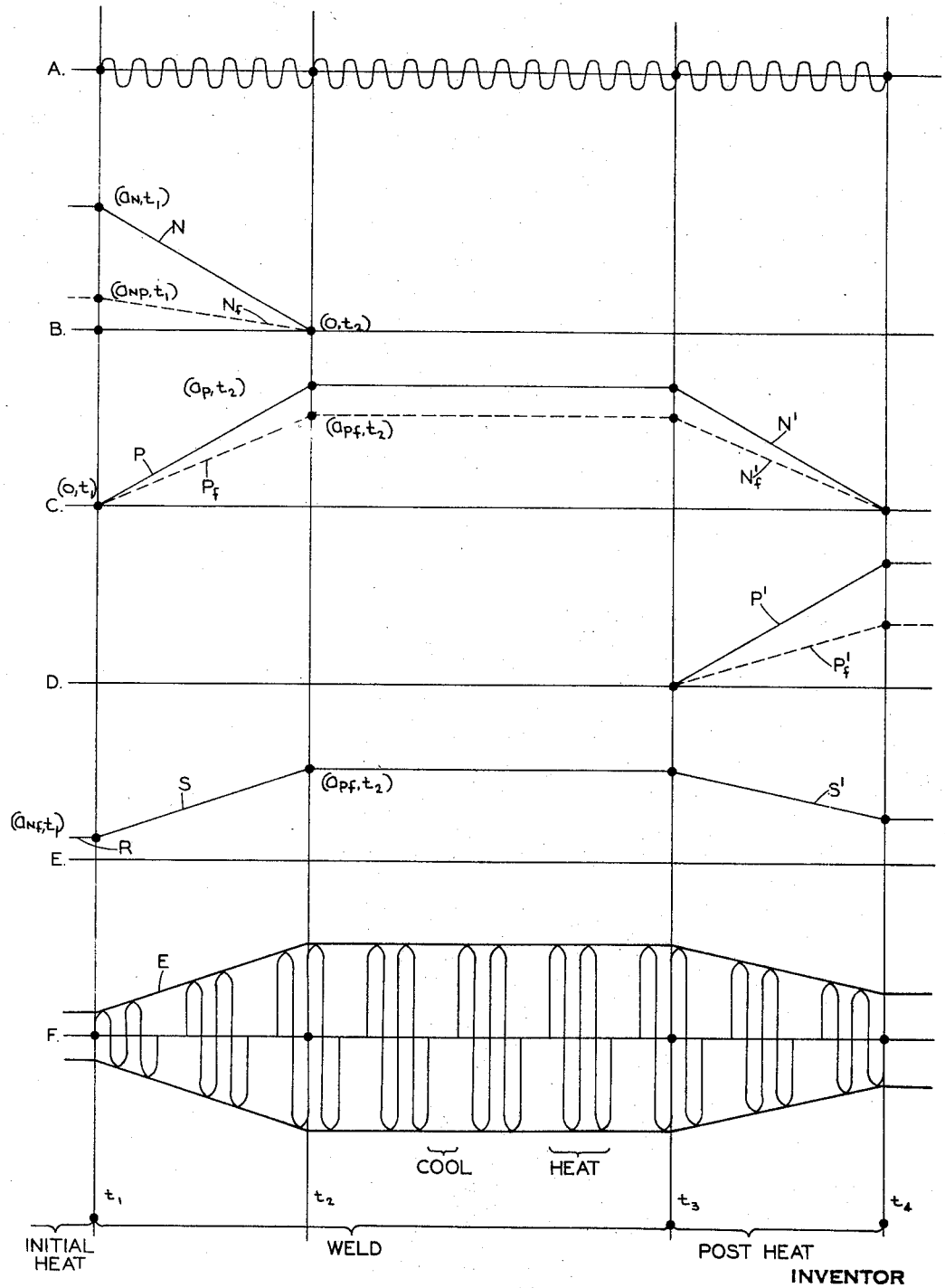
FIG. 1 is a diagram showing various electrical waveforms associated with the use of the method and apparatus embodying the invention.
Figure 2:
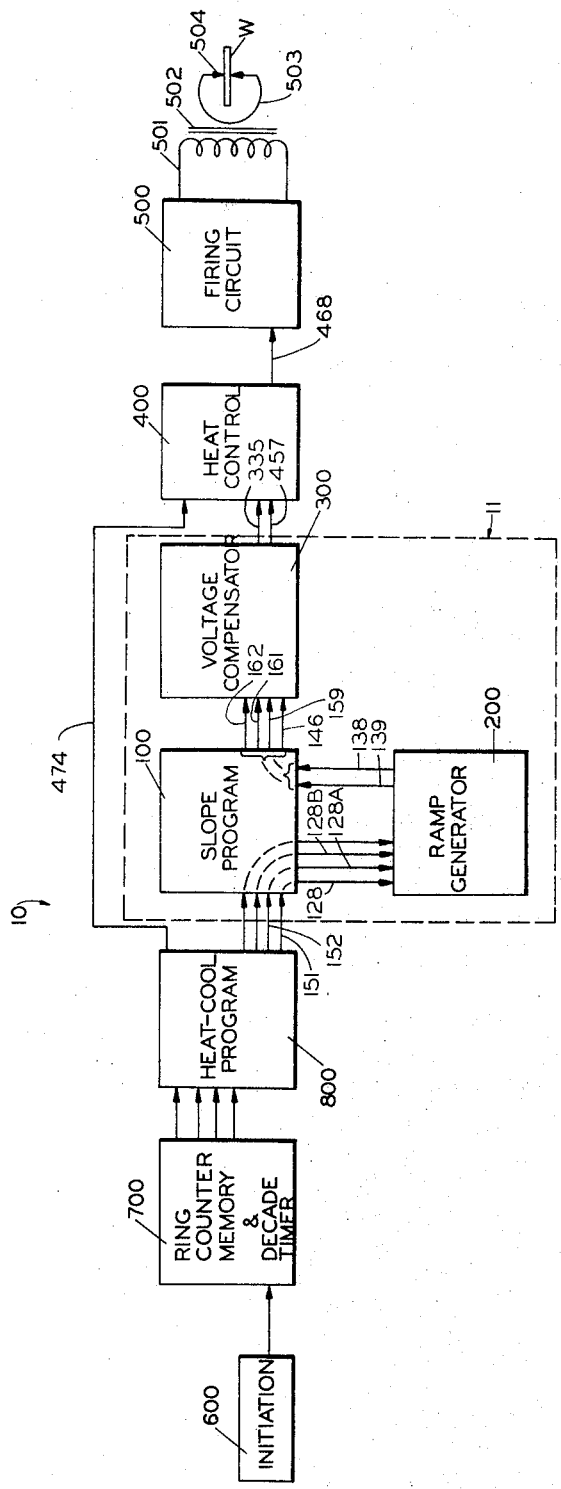
FIGURE 2 is a block diagram of a resistance weld timer circuit of the type in which the method and apparatus embodying the invention can be employed.

Referring now to the drawings, FIGURE 2 discloses a block diagram of a weld timer generally indicated by the numeral 10 which is intended to illustrate an operating environment in which the slope producing circuitry, more directly concerned with the present invention, may be advantageously used. The slope generating circuitry which is generally indicated at 11 comprises a slope program unit 100, a ramp generator unit 200 and a voltage compensator unit 300. The ramp slope generator 200 produces linear positive and negative ramp signals P and N, respectively (FIGURES 1B and 1C), which have predetermined, start times, slopes and end point amplitude coordinates and therefore have precisely determined end times, the ramp signals P and N having the same start and end times. The slope program unit 100 determines, in response to prior circuitry as discussed hereinbelow, the starting time $t_1$ of ramp generation, i.e., the time coordinate of the initial point of ramps N and P. The slope program unit 100 is also used to gate the ramp signals N and P from the ramp generator to the voltage compensator unit 300 at the proper time.

The voltage compensator unit 300 selects predetermined amplitude fractions of the ramp signals N and P, the resulting linear fractional ramp signals being indicated at $N_f$ and $P_f$ in broken lines. The negative going fractional rap $N_f$ has an initial amplitude $a_{Nf}$ which may vary from zero to the initial amplitude of the negative going ramp N, i.e., $a_N$. The final amplitude coordinate of negative going ramps N and $N_f$ is zero as is the initial amplitude coordinates of the positive going ramps P and $P_f$. Similarly, the positive going fractional ramp $P_f$ has a final amplitude $a_{Pf}$ which is a desired fraction of the final amplitude $a_P$ of the ramp P. The voltage compensator 300 also adds the fractional ramps $N_f$ and $P_f$ to provide a sloped portion S in a reference signal indicated at R in FIGURE 1E. The sloped portion S has an initial amplitude equal to that of the negative going fractional ramp $N_f$ and a final amplitude equal to that of a positive going fractional ramp $P_f$. The resulting slope signal S is linear and has precisely defined amplitude and time end point coordinates. The resulting slope signal S may have either a positive slope, as here indicated, or a negative slope (should $a_{Pf}$ be less than $a_{Nf}$).

The reference signal R may be used in any one of a variety of ways to produce a weld current envelope indicated at E in FIGURE 1F having a slope corresponding thereto. In the particular embodiment shown in FIGURE 2, the reference signal R is applied to a heat control unit 400. The heat control unit 400 here changes the phase angle of the alternating current supply feeding the weld timer 10 at which weld current flow is initiated as a direct function of the instantaneous amplitude of the reference signal R. A conventional firing circuit 500, controlled by the heat control unit 400, in turn energizes the primary 501 of a conventional welding transformer 502, the secondary 503 of which supplies current to welding electrodes 504 for welding a workpiece W.

Action of a slope program unit 100 may be initiated by any convenient means desired in a particular embodiment shown in FIGURE 2, such is accomplished through the use of an initiation unit 600 and a memory and interval timer unit 700 of any conventional type. The unit 700 may comprise, for example, a ring counter memory made up of a plurality of bistable circuits and suitable timing means for energizing successive ones of the bistable circuits at the end of successive time intervals corresponding to the usual initial heat, weld, post heat and other functions of the timer 10. The firing circuit 500, initiating unit 600 and memory and interval timer unit 700 may be similar to corresponding units of application Ser. No. 369,727 assigned to the assignee of the present invention.

Although it is not essential to the present invention at least in its broader aspects, the timer 10 as shown in FIGURE 2 also includes a heat-cool program unit 800 which is interposed between the memory unit 700 and the slope program unit 100. The heat-cool program unit 800 may be of any convenient type actuable for blocking, during a given interval, selected portions of the normal current waveform through the workpiece. As shown in FIGURE 1F, the heat-cool program unit 800 may, for example, be arranged to allow two cycle bursts of current flow through the workpiece spaced by one cycle period in which current flow is blocked, thus providing alternating heating and cooling periods. The heat-cool program unit 800 is here included to illustrate that the slope generating circuit 11 is readily adapted to use with intermittent current flow welders as well as continuous current flow welders.

Unless otherwise stated the transistors discussed hereinbelow are NPN types. However, it is contemplated that should signals of opposite polarity to those appearing in the present circuit be desired, the polarity of the positive and negative supply lines and of the polarized circuit elements can be reversed.

(A) Slope program unit 100

Figure 3:
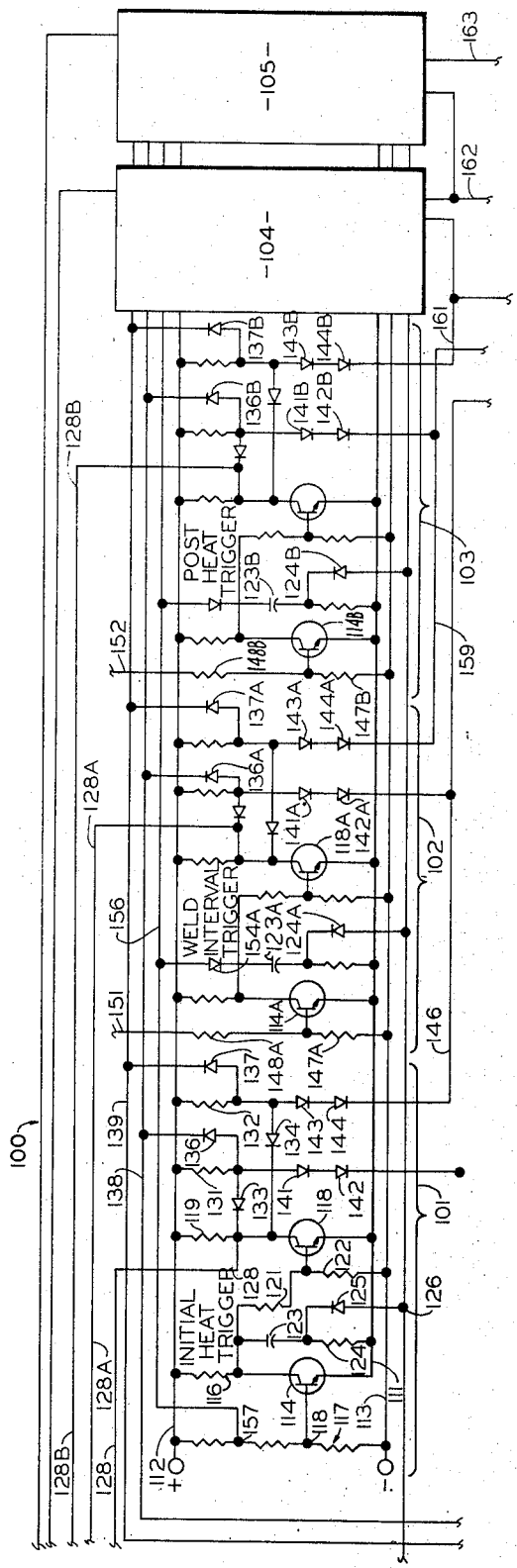
FIGURE 3 is a schematic diagram of the slope program unit of the weld timer of FIGURE 2.

Turning now to the circuitry more closely embodying the present invention, attention is directed to the slope program unit 100 (FIGURE 3). The slope program unit 100 comprises a plurality, here five, of trigger circuits 101–105, only the trigger circuits 101–103 being shown in detail. In the particular embodiment shown, the trigger circuits 101–103 are associated with and energized during the initial heat, weld and post heat intervals, respectively, of the timer 10, the triggers 104 and 105 being supplied if desired for additional intervals of any desired type. The trigger circuits are preferably similar and a description of one thereof, here the trigger circuit 101, will suffice for all, with exceptions hereinafter noted. Thus, parts of the trigger circuits 102 and 103 corresponding to parts of the trigger circuits 101 will be referred to by the same reference numerals thereas with the suffixes A and B respectively added thereto.

The trigger 101 is supplied with operating potential from a common or zero potential line 111 and from positive and negative D.C. potential lines 112 and 113, respectively, which may be at any convenient D.C. voltage with respect to the common line 111 such as, for example, positive 24 volts and negative 24 volts, respectively. The trigger circuit 101 includes a transistor 114, the emitter of which connects to common line 111 and the collector of which connects through a voltage dropping resistor 116 to positive potential line 112. A three section resistive voltage divider 117 connects between the positive and negative potential lines 112 and 113. The base of transistor 114 connects to the lower intermediate point 118 of the divider 117, is biased thereby for conduction and so is normally conductive. The trigger 101 includes a further transistor 118, the emitter of which is connected to ground line 111 and the collector of which is connected through a resistance 119 to positive potential line 112. The base of transistor 118 connects through a resistance 121 to the collector of the first transistor 114 and through a further resistance 122 to the negative potential line 113.

With transistor 114 conductive, there is insufficent current flow through resistor 121 to maintain transistor 118 conductive. On the other hand, the high collector potential transistor 114 occurring when transistor 114 is nonconductive assures conduction of transistor 118. Thus, the transistors 114 and 118 are alternatively conductive, the transistor 118 in its normal state being held in nonconductive condition by normally conducting transistor 114.

A capacitor 123 connects to the collector of transistor 114 and through a resistance 124 to common line 111. The cathode of a diode 125 connects between said resistance 124 and capacitor 123 and the anode thereof is connected to a line 126. The rises in collector potential when transistor 114 stops conducting and then drops in collector potential when the transistor 114 begins conduction are differentiated by the capacitor 123 to provide a series of positive and negative spike pulses, the latter being applied by the diode 124 to line 126. Thus, a negative spike pulse appears on the line 126 whenever one of the transistors 114, 114A, etc., becomes conductive, the line 126 feeding such negative pulses to the ramp generator unit 200.

For the sake of convenience in reference the trigger circuits 101–105 will hereinafter be considered energized when the first or leftward transistor 114, 114A, etc., thereof is conductive and de-energized when the first transistor 114, 114A, etc., thereof is nonconductive.

A clamping line 128 connects from the collector of transistor 118 to the ramp generator unit 200 as hereinafter described. Resistors 131 and 132 are connected between the positive potential line 112 and the anode ends of respective diodes 133 and 134, the cathodes of which are connected to the collector of transistor 118. The lower or diode connected ends of resistors 131 and 132 connect to further diodes 136 and 137, the cathodes of which are connected to lines 138 and 139, respectively, from the ramp generator unit 200 upon which the decreasing and increasing ramp signals are carried as hereinafter described. The lower ends of the resistors 131 and 132 still further connect to series diode pairs 141, 142 and 143, 144, respectively, which are oriented for conventional current flow away from said resistors. The cathode of diode 144 connects to a line 146 to the voltage compensator unit 300 whereas the cathode of diode 142 is not connected to anything. The function of the diodes 133 and 134 is to lamp the lower ends of resistors 131 and 132 to the common line 111 when transistor 118 is conductive to prevent the decreasing and increasing ramp signals on lines 138 and 139 from passing through diodes 136 and 137 and thence to their corresponding diode sets 141, 142 and 143, 144.

Remaining trigger circuits 102 and 103 differ from the above-described trigger circuit 101 in the following ways. The base of first transistors 114A and 114B of triggers 102 and 103, respectively, connect to negative potential line 113 through resistances 147A and 147B and further connect through signal resistors 148A and 148B, respectively, to interval start lines 151 and 152, respectively. Said interval start lines 151 and 152 are rendered positive for the weld and post heat intervals, respectively, here through the heat-cool program unit 800, as a result of conventionally occurring changes of state of corresponding bistable circuits in the memory unit 700. The trigger circuit 102 and 103 are normaly de-energized, i.e., transistors 114A and 114B are normally nonconductive, and are rendered individually energized by the aforementioned positive potential appearing on the lines 151 and 152, respectively.

The weld and post heat triggers 102 and 103 further differ from the initial heat trigger 101 in that the collectors of transistors 114A and 114B connect to clamping diodes 154A and 154B, respectively, the anode ends of which connect to a line 156 in turn connected to the upper intermediate point 157 of voltage divider 117 above referred to. Thus, when one of the trigger circuits 102–105, e.g., trigger 102 is energized, the line 156 and point 157 will be clamped to the common line 111 by the corresponding diode 154A and conductive transistors 114A thereby dropping the potential of base supply point 118 below the level required for conduction of initial heat transistors 114. Thus, the initial heat trigger 101 is de-energized as a result of energization of one of the further triggers 102–105.

It should further be noted that the increasing ramp signal path through diodes 137, 143 and 144 in the initial heat trigger 101 and the decreasing ramp signal path through diodes 136A, 141A and 142A in the weld interval trigger 102 both connect to the line 146 above described in turn connected to the voltage compensator circuit 300. In a similar manner, the positive ramp paths of the triggers 102–104 connect through lines 159, 161 and 162, respectively, to the voltage compensator unit 300 along with the negative ramp path of the next triggers 103–105, respectively, the last trigger 105 having its positive ramp path, not shown, connected to the voltage compensator unit 300 by a conductor 163.

(B) Ramp generator unit 200

Figure 4:
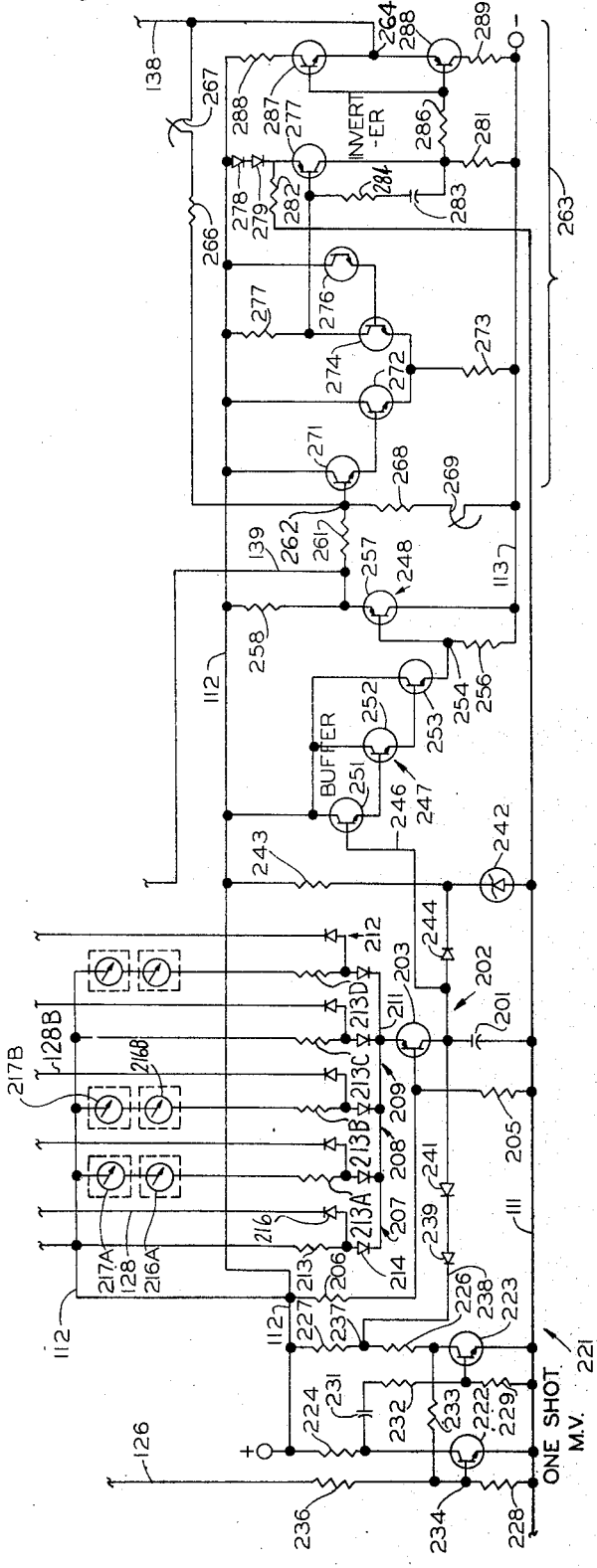
FIGURE 4 is a schematic diagram of the ramp generator unit of the timer of FIGURE 2 above.

The ramp generator unit 200 (FIGURE 4) includes a capacitor 201 across which the positive going ramp signal is generated by a constant current source generally indicated at 202. More particularly, the constant current source 202 here includes a PNP transistor 203, the capacitor 201 being connected between the collector of transistor 203 and common line 111. A voltage divider comprising resistors 205 and 206 is connected between the positive potential line 112 and common line 111. The base of transistor 203 connects between resistors 205 and 206 and is furnished suitable base bias thereby. The emitter of transistor 203 connects to a plurality of parallel networks indicated at 207–209 corresponding to the initial heat, weld and post heat triggers 101–103.

If desired additional networks 211 and 212 may be provided where additional triggers 104 and 105 are provided. The networks are each arranged to provide emitter current to the transistor 203 upon energization of the corresponding trigger circuit.

The networks are preferably identical except as hereinafter described and only one thereof, the initial heat network 207 will be described in detail, parts of the remaining networks 208, 209, 211 and 212 being referred to by the same reference numerals as corresponding parts of network 207 with the suffices A–D, respectively, being added thereto. Considering the network 207, for example, same consists of a resistance 213 connected between the positive potential line 112 and the anode of a diode 214, the cathode of which is connected to the emitter of transistor 203. The anode of a clamping diode 216 connects between the resistance 213 and diode 214 and the cathode of the clamping diode connects to clamping line 128 above described and thereby to the collector of the second transistor 118 of initial heat trigger circuit 101. Diode 214 prevents clamping diode 216 from drawing current from whichever of the other networks 208, 209, 211 and 212 is unclamped. During the initial heat interval, the initial heat trigger 101 is energized, as above described, so that the transistor 118 thereof is off, the network 207 is unclamped and current is furnished thereby to the transistor 203 and capacitor 201, the remaining trigger circuits being de-energized so that the networks 208, 209, 211 and 212 are clamped and do not supply current to the transistor 203.

The networks 208, 209 and 212 (where the latter is provided) differ from the network 207 in that each has adjustable resistance means disposed between the positive potential line 112 and the corresponding resistors 213A, 213B and 213D thereof. The adjustable resistance means here comprise a pair of decade resistance selectors, one for units and one for tens, arranged so that the numerical setting of which equals the number of cycles of the alternating current supply (FIGURE 1A) serving the timer 10 corresponding to the time required to charge the capacitor 201 therethrough. Considering the network 208, the units resistance selector is indicated at 216A and the tens resistance selector as indicated at 217A.

A one shot multivibrator circuit generally indicated at 221 comprises a pair of alternatively conducting transistors 222 and 223, the emitters of which are connected to common potential line 111. The collector of transistor 222 connects to positive potential line 112 through a resistor 224 and the collector of transistor 223 connects to positive potential line 112 through series resistors 226 and 227. The bases of transistors 222 and 223 connect to the common potential line 111 through resistors 228 and 229, respectively. The collector of transistor 222 is connected to the base of transistor 223 through a series capacitor 231 and resistance 232. The collector of transistor 223 connects to the base of transistor 222 through resistor 233. Transistor 223 is normally held nonconductive since the capacitor 231, once charged, blocks current flow to the base thereof. As a result of the normal nonconductive state of transistor 223, sufficient base current is supplied to transistor 222 through resistances 227, 226 and 233 to cause conduction of said transistor 222. The base 234 of transistor 222 forms the input terminal for the multivibrator 221 and the base 234 is connected through a resistance 236 to the above-described negative trigger pulse line 126 from the slope program unit 100.

It will be recalled that whenever one of the triggers 101–105 becomes energized, a negative pulse appears on the line 126, such pulse being transmitted by resistor 236 to the base 234 of transistor 222 to turn same off. The resulting high collector potential on transistor 222 results in charging current flow through capacitor 231 and resistance 232 to the base of transistor 223 turning same on, the transistor 223 remaining conductive as long as charging current flows through capacitor 231. Capacitor 231 charges for a period of time determined by the value of resistances 224 and 232 and relatively quickly reaches a fully charged state whereat no more current flows through the base circuit of transistor 223 causing the latter to shut off and returning the one shot 221 to its rest condition. As a result, of the conduction of the transistor 223 a drop in potential appears at point 237 between collector resistances 227 and 226 thereof for a short time. Series diodes 239 and 241 are provided in a line 238 connected to the point 237 and are oriented to drop the potential on the collector of constant current transistor 203 to a predetermined potential close to that of common line 111 when transistor 223 conducts so as to discharge capacitor 201. When the transistor 223 shuts off, ramp generating capacitor 201 begins charging once again through constant current transistor 203 at a rate determined by the components of whichever one of the networks 207, 208, 209, 211 and 212 is unclamped. Diodes 239 and 241 prevent additional charging current from flowing into capacitor 201 from resistance 227 in the one shot 221.

A Zener diode 242 has its anode connected to common line 111 and its cathode connected through a resistance 243 to positive potential line 112. The upper plate of capacitor 201 connects to the anode of a diode 244, the cathode of which connects to the cathode of Zener diode 242 whereby the voltage of the upper plate of ramp generating capacitor 201 is limited to the Zener breakdown voltage of Zener diode 242. Diode 244 prevents additional charging current from flowing into the capacitor 201 from resistance 243.

The value of the resistor 206 is preferably relatively small compared to the resistance of its series resistor 205 and of network resistors 213, 213A, 213B, etc. As a result, the major portion of the current flow through resistance 205 will be from resistance 206 so that the base potential and emitter-base current of transistor 203 remain constant for a given network resistance in series with such emitter and despite variation of the charge level of capacitor 201.

The upper plate of the ramp generating capacitor 201 connects through a line 246 to the input of a buffer circuit 247 which in turn feeds an emitter follower output stage 248. The buffer 247 insures that later stages will not load, i.e., draw current from, the capacitor 201 and thus protects the shape of the ramp signal generated by capacitor 201. In the particular embodiment shown, the buffer 247 comprises a plurality, here three, of transistors 251–253 connected in a Darlington circuit. More particularly, the collectors of transistors 251–253 are all connected to the positive potential line 112. The emitter of transistor 251 connects to the base of transistor 252, the emitter of which connects to the base of transistor 253. The input line 246 connects to the base of transistor 251. The emitter of transistor 253 is the buffer output point and connects at 254 to the input of emitter follower circuit 248.

The emitter follower circuit 248 comprises a PNP transistor 257, the base 254 of which is fed by the buffer output and biased by a resistor 256 connected to negative potential line 113. The collector of transistor 257 connects to the negative potential line 113 and the emitter thereof connects through a resistor 258 to positive potential line 112. The increasing ramp signal P (FIGURE 1C) appears on the emitter of transistor 257 and is applied thereby to increasing ramp line 139 above described with respect to the slope program unit 100.

The positive going ramp signal P is also applied through a resistor 261 (FIGURE 4) to the input 262 of an operational amplifier 263 of the phase-inverting type. The conventional amplifier 263 produces at its output terminal 264 a negative going ramp signal N (FIGURE 1B) inverted in slope from the increasing ramp on the line 139, which has the same amplitude displacement thereas and which occurs essentially simultaneously therewith. The operational amplifier 263 also prevents any loading of the increasing ramp signal appearing on the line 139 as a result of means hereinafter described fed with the decreasing ramp signal. A resistance 266 and feedback potentiometer 267 are connected in series between output terminal 264 and input terminal 262 of the operational amplifier 263, adjustment of the feedback potentiometer 267 maintaining the gain of the operational amplifier at unity. A resistance 268 and potentiometer 269 are connected in series between the input terminal 262 and the negative potential line 113, adjustment of the potentiometer 269 causing the amplitude displacement of the negative going ramp signal N at output terminal 264 to be equal to that of the positive going ramp signal P.

In the particular embodiment shown, the operational amplifier 263 comprises a pair of Darlington connected transistors 271 and 272 having collectors connected to the positive potential line 112. The base of transistor 271 is connected to the input terminal 262 and its emitter is connected to the base of the transistor 272. The emitter of transistor 272 connects through a resistor 273 to the negative potential line 113. A further Darlington connected pair of transistors 274 and 276 is arranged with the emitter of transistor 276 connected to the base of transistor 274. The collectors of such transistors connect to the positive potential line 112, the collector of transistor 274 connecting thereto through a resistance 277. The emitter of transistor 274 connects to that of transistor 272 above described. Thus, the positive going ramp signal applied to the input terminal 262 is reproduced at the upper end of resistor 273 then appears at the collector of transistor 274 displaced upwardly somewhat in potential.

The collector of transistor 274 connects to the base of a PNP transistor 277 and applies the positive going ramp signal thereto. The emitter of transistor 277 connects to the positive potential line 112 through series diodes 278 and 279 oriented to supply conventional current flow thereto. The collecter of transistor 277 connects to the negative potential line 113 through a resistance 281. The emitter of transistor 277 is also connected through a resistance 282 to the base of transistor 276 and thence to the common line 111. A negative feedback path comprising a capacitor 283 and resistance 284 in series therewith connects from the collector to the base of transistor 277 to enhance the stability thereof. The ramp signal appears in inverted form, i.e., as a negative going ramp signal on the collector of transistor 277 and is applied through a resistor 286 to the bases of NPN transistor 287 and PNP transistors 288. The transistors 287 and 288 are connected in series between the positive and negative potential lines 112 and 113, the emitters thereof bieng connected together at output terminal 264. The collector of NPN transistor 287 is connected to the positive potential line 112 through a resistance 288 and the collector of PNP transistor 288 is connected to the negative potential line 113 by a resistor 289. As the signal voltage on the bases of transistors 287 and 288 drops, said transistors become respectively less and more conductive whereby the potential of point 264 drops. Thus, the negative going ramp signal appears on the terminal 264. Terminal 264 is connected to the negative ramp line 138 above described with respect to the slope program unit 100.

Turning now to the voltage compensator unit 300 (FIGURE 5), there is provided an additional circuit generally indicated at 301 including an operational amplifier 302 of the phase-inverting type. The internal circuitry of the operational amplifier 302 is preferably identical to that of the operational amplifier 263 above described and, hence, need not be further described. The input terminal 303 of the operational amplifier 302 is connected to the output terminal 304 thereof through a fixed feedback resistor 306. The ramp lines 146, 159, 161, 162 and 163 connected through potentiometers 308, 309, 311, 312 and 313, respectively, to fixed resistors 314, 316, 317, 318 and 319, respectively, are in turn connected to the common line 111. The sliders of the potentiometers 308–313 are connected through respective resistors 321, 322, 323, 324 and 326 to the input 303 of the operational amplifier 302. Since only one of the trigger circuits 101–105 operates at a given time, no more than a pair of the potentiometers 308–313 are energized at one time. Thus, if the timer 10 is in its weld interval, the weld interval trigger 102 will be energized. In consequence, line 146 will be supplied with the negative going ramp signal and line 159 with the positive going ramp signal. The slider of potentiometer 308 may be adjusted to apply a desired fraction $N_f$ (FIGURE 1B) of the negative going ramp signal N to the operational amplifier input 303 and similarly the slider of potentiometer 309 may be adjusted to apply any desired fraction $P_f$ of the positive going ramp signal P to the input 303. As one trigger is shut off and the next one to the right thereof is turned on, the potentiometer used to select a fraction of a previous positive going ramp signal P will thereafter select the same fraction of a new negative going ramp signal N' (FIGURE 1C) so that in the particular embodiment shown the maximum fractional ramp amplitude of one timer will be identical to the initial maximum amplitude of the next interval so that the signal applied to the potentiometer discussed will not undergo an amplitude discontinuity at the boundary between successive intervals.

The positive and negative going fractional ramp signals are added at the input 303 to provide a sum reference signal corresponding to the signal R of FIGURE 1E. As mentioned above, the operational amplifier 302 is in the present embodiment an inverting amplifier so that the reference signal R appears at the output point 304 inverted in amplitude. If desired, it is contemplated that the operational amplifier 302 could be a noninverting amplifier so that the reference signal would appear at the output thereof without inversion. However, in the particular embodiment shown, the inverted output of operational amplifier 302 is fed through a resistance 327 to the input 328 of a further inverting operational amplifier generally indicated at 329. The operational amplifier 329 is again preferably identical to the operational amplifier 263 above described in detail and so the internal connections thereof need not be further described.

A negative feedback circuit connects from the output 331 of the operational amplifier 329 to the input 328 thereof and comprises a calibrating resistor 332 which determines the gain of the operational amplifier 329 and a series resistance 333 and capacitor 334 connected in parallel with the calibrating resistor 332 to limit the high frequency response of the circuit so as to provide stability without degrading the average gain. If desired, a further signal may be coupled to the input 328 through a resistance 336 from any convenient means generally indicated by the block 337 which in turn is driven by transformer 338 for compensating the output signal at terminal 331 for the characteristics of different welding guns. The primary winding of transformer 338 is connected between positive line 112 and a line 457 described below. Output terminal 331 of the operational amplifier 329 feeds a line 335.

Although the reference signal R appearing on the output terminal 331 of operational amplifier 329 can be utilized to direct heat control units of a variety of types in various ways to provide a desired weld current envelope, a portion of the heat control unit 400 of the welding timer 10 of FIGURE 2 is here shown in detail to illustrate one example of such direction.

The heat control unit 400 includes a trigger pulse generating portion 401 hereinafter described including transistors 402, 403, 404, 406, 407 and 408. In general, the trigger pulse generator portion 401 generates a pulse during each half cycle of the alternating current supply (FIGURE 1A) which defines the position on the alternating current supply waveform at which weld current will begin flowing to the workpiece W. Transistors 402 and 403 comprise a trigger circuit. The A.C. source 411 which powers the timer 10 drives the primary winding 412 of a power transformer 413. The secondary winding 414 of the transformer 413 has its ends connected to rectifiers 416 and 417 arranged as a full wave rectifier circuit. The cathodes of the rectifiers 416 and 417 are connected to each other and through a resistance 419 to the base 421 of transistor 402. The center tap of the secondary 416 connects to the common line 111. Thus, the base 421 is provided with a continuous series of positive half waves. The base 421 connects through a resistor 422 to the negative potential line 113 and to the anode of the diode 423 which is connected to the common line 111 for clamping said base substantially to the potential of the common line or below. Transistor 402 is PNP type having its emitter connected to the common line 111 and its collector connected through resistors 424 and 426 to the negative potential line 113. The base of transistor 403 is connected between resistances 424 and 426. The collector of transistor 403 connects through a resistance 427 through the positive potential line 112 and through a resistor 428 to the negative potential line 113.

Transistor 404 is a PNP type having its emitter connected through a resistor 429 to the positive potential line 112 and its collector connected through a resistor 431 to negative potential line 113. The base of transistor 404 connects to the anode of the diode 432, the other end of which connects to the collector of preceding transistor 403. The base of transistor 404 also connects through series resistance 433 and potentiometer 434 to positive potential line 112 and through a capacitor 436 to the common line 111. The transistor 402 is rendered conductive for a brief period at the zero and 180 degree points of the full rectified waveform applied to the base 421 thereof and, as a result of its conduction, raises the potential of the base of transistor 403 sufficiently at such times to cause conduction of the transistor 403 for approximately one millisecond centered about the zero and 180 degree points of the A.C. supply wave form. Conduction of the transistor 403 drops the base voltage on transistor 404 substantially for the potential of the negative potential line 113 to render same conductive. Capacitor 436 is gradually discharged as a result of conduction through potentiometer 434 and resistance 433. As capacitor 436 discharges and makes the base of transistor 404 less negative, current flow through transistor 404 lessens. transistor 404 substantially to the potential of the negative nal appearing on the emitter thereof is a sawtooth voltage having a sharp initial drop and a gradually rising slope thereafter, such a sawtooth pulse occurring every half cycle of the alternating current waveform.

The output of transistor 404 is applied through a resistance 437 to the emitter of transistor 406, such emitter also being connected through a resistor 438 and clamping diode 439 to the common potential line 111, the anode of diode 439 being connected to line 111 for insuring that the lower end of resistor 438 does not fall to a negative potential. The anode of a further diode 441 connects to the emitter of transistor 406, the cathode thereof connecting to common line 111. The output line 335 of operational amplifier 329, discussed hereinabove with respect to the voltage compensator unit 300, is connected through a diode 442 and the resistance 438 to the emitter of transistor 406, the anode of diode 442 facing the output of operational amplifier 329. The base of transistor 406 is connected to the common line 111 and the collector thereof connects through a resistor 443 to the positive potential line 112.

The positive going portions of the reference signal R from the operational amplifier 329 tends to block conduction of the transistor 406. More particularly, transistor 406 will conduct at the beginning of each half cycle and will switch off at some point in the half cycle set by the level of the positive going reference signal from the voltage compensator unit 300 as the latter causes the net emitter current of the transistor to decrease to zero. Thus, transistor 406 conducts lesser and lesser portions of successive half cycles while the sloped portions of the reference signal R is applied thereto, and therefore, the collector of the transistor 406 swings positive at an increasing later point in each successive half cycle. Transistor 407 is connected as an emitter-follower. More particularly, the collector of transistor 407 connects to positive potential line 112, the base thereof connects to the collector of preceding transistor 406 and the emitter thereof connects through a resistor 444 to common line 111. It should be noted that a resistor 446 connects between the base of emitter-follower transistor 407 and the collector of afore-mentioned transistor 403 to insure the presence of a pulse on the base of the transistor 407 in the event that the signal from the voltage compensator unit 300 should become extremely positive (which does not normally happen). Such an extremely positive signal might cause the transistor 406 never to conduct so that the signal coupled to transistor 407 might never have a positive going portion. Thus, the connection of resistor 446 insures that the output of transistor 407 begins each half cycle at a low level.

The cathode of a diode 447 is connected to the base of transistor 407 and the anode thereof is connected to the common line 111 to prevent the base of transistor 407 from being driven negative.

A capacitor 448 and series resistor 449 couple the emitter of transistor 407 to the base of transistor 408. The base of transistor 408 is also connected to a common line 111 through a resistor 451 and clamping diode 452. The anode of diode 452 connects to the common line 111 and prevents the base of transistor 408 from swinging negative. The emitter of transistor 408 connects to the common line 111 and the collector thereof connects to the anode of a diode 453 which in turn is connected to the positive potential line 112. The primary winding 454 of a transformer 456 connects across the diode 453. The collector of transistor 408 also connects through a line 457 back to the primary winding of transformer 338 in the voltage compensator unit 300 the secondary winding of such transformer being connected to energize the circuits 337.

Transistor 408 is rendered conductive at progressively later phase points in successive half cycles by the emitter output of transistor 407. This drives the lower end of the primary of transformer 338 downwardly in potential applying a positive pulse to the circuitry 337.

In conducting through the transformer primary 454, the transistor 408 causes a series of positive pulses which appear in the secondary 461 thereof. The upper end of secondary 461 connects through resistances 462 and 463 in series to the gate of an SCR 464, a capacitor 466 being connected in series with resistor 462 across the secondary 461. The lower end of secondary 461 connects to the cathode of SCR 464. The anode of SCR 464 connects through a line 468 to the firing circuit of the weld timer 10 of FIGURE 2. The cathode of SCR 464 is connected to the common line 111, in the particular embodiment shown, through a further, similarly oriented SCR 469 whose cathode in turn connects through diodes 471 and 472 to common line 111. The gate of the SCR 469, when provided, is connected to suitable circuitry of any convenient type indicated generally at 473 and in turn connected to the heat-cool program unit 800 by a line 474.

In providing positive pulses to transformer 456, the transistor 408 furnishes gate drive through resistors 462, 463 to SCR 464 at the desired point in each source half cycle at which current flow through the workpiece is to begin. The SCR 469, where provided, is, as a result of circuitry 473 and the heat-cool program unit 800, capable of preventing current flow through SCR 464 and, hence, preventing current flow through during preselected half cycles of the alternating current supply. In this way, the interrupted weld current flow indicated in FIGURE 1F and the resulting alternating periods of heating and cooling may be provided during a given interval of the timer 10, if desired. On the other hand, noninterrupted workpiece current flow is readily obtainable, as by omitting the SCR 469, unit 800 and circuitry 473.

OPERATION

Although the operation of the apparatus embodying the invention has been indicated to some extent above, same will now be reviewed to insure a complete understanding of the invention.

The first interval of the timer 10 in which current is supplied to the workpiece is the initial heat interval. During the inital heat period, only the trigger circuit 101 (FIGURE 3), of the trigger circuits 101–105, is energized. As a result, networks 208, 209, 211 and 212 (FIGURE 4) are clamped and only the initial heat network 207 is unclamped and furnishes current through conductive transistor 203 to charge the capacitor 201 to its limit defined by Zener diode 242. As a result of the charged condition of capacitor 201, buffer circuit 247 and emitter follower 257 apply at high potential to the increasing ramp line 139 and operational amplifier 263 applies a relatively low potential to negative ramp line 138.

Since only the trigger circuit 101 (FIGURE 3) is energized, the remaining trigger circuits 102–105 cannot apply the potentials on line 138 and 139 to the voltage compensator unit 300. In the energized trigger circuit 101, however, the transistor 118 is nonconductive. Therefore, diodes 133 and 134 do not clamp the anodes of diodes 136 and 137, respectively, to common line 111 but rather allow same to be maintained, in the absence of a signal, at the potential of the positive potential line 112 by their associated resistors 131 and 132. As a result, the negative potential on line 138 is applied to diodes 141 and 142. However, the diode 142 is not further connected and, as a result, the negative signal from line 138 goes no further.

Figure 5:
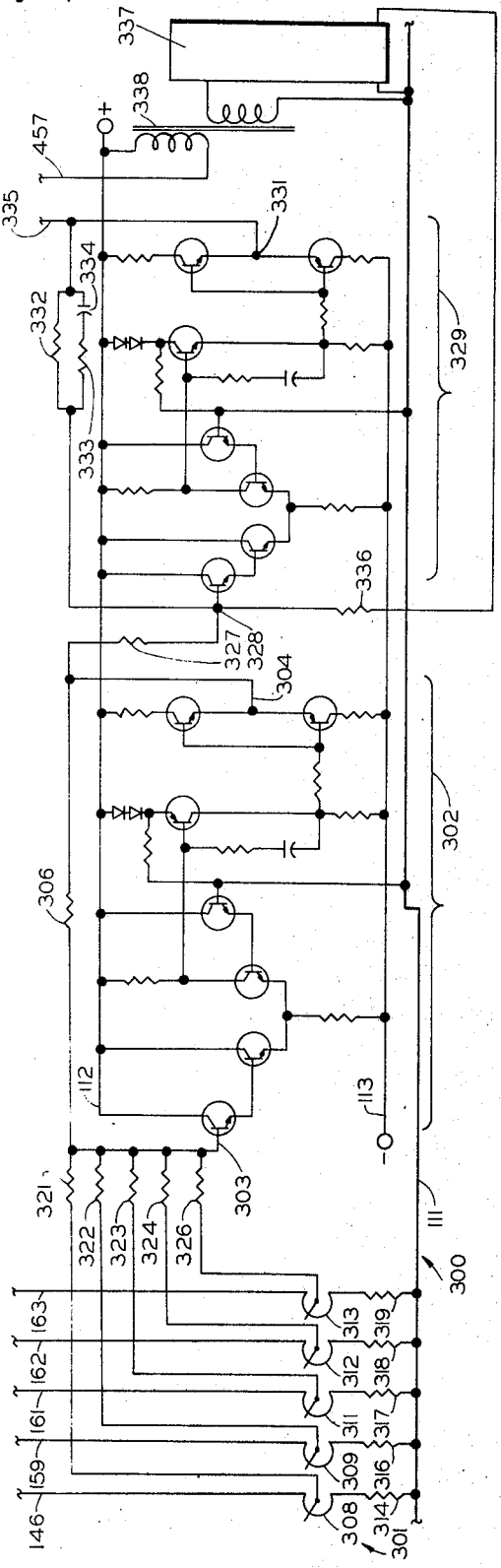
FIGURE 5 is a schematic diagram of the voltage compensator unit of the weld timer of FIGURE 2.

On the other hand, the positive signal from line 139 is impressed by diodes 143 and 144 on the line 146 and thereby on the initial heat potentiometer 308 (FIGURE 5). The amplitude of the impressed signal corresponds to the amplitude $a_N$ indicated in FIGURE 1B. The initial heat potentiometer 308 may be set at any desired position but for the sake of illustration will be considered to set intermediate its limits and at a location to impress a positive signal through resistor 321 on the input terminal 303 of operaitonal amplifier 302 which signal corresponds in amplitude to value $a_{Nf}$ indicated in broken lines in FIGURE 1B. As a result, a negative potential appears at the output 304 at the operational amplifier 302 which is applied to the input of operational amplifier 329 and appears at the output 331 thereof as a positive reference potential R corresponding to amplitude $a_{Nf}$ adjusted, if desired, for particular weld head characteristics by feedback circuitry 337.

Figure 6:
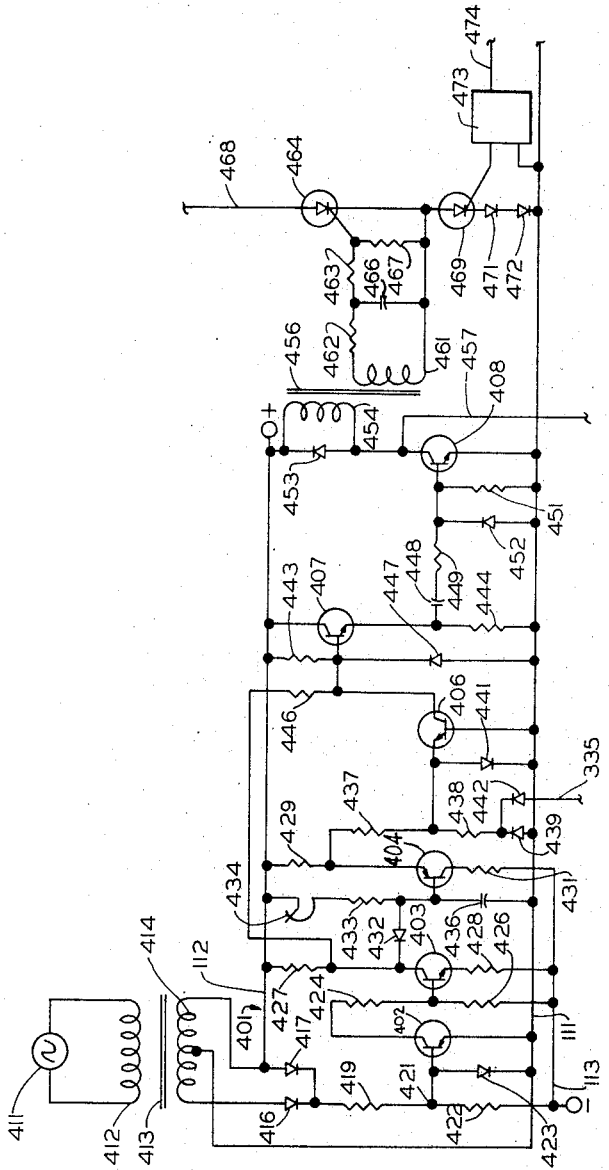
FIGURE 6 is a schematic diagram of a portion of the heat control circuit of the weld timer of FIGURE 2.

Such adjusted potential is applied by line 335, diode 442 (FIGURE 6) resistance 438 to the base of transistor 406 in the heat control unit 400. The presence of this adjusted potential on the emitter of transistor 406 allows the saw tooth waveform impressed thereon from the emitter follower transistor 404 to render same conductive only for a period at the beginning of each half cycle of the alternating current waveform illustrated in FIGURE 1A. Transistors 407 and 408 provide gate drive to the SCR 464 each time the transistor 406 becomes nonconductive, i.e., at a point relatively late in each half cycle. The actual energization of the firing circuit and welding transformer can be blocked during selected cycles by failure to energize the SCR 469 where same is provided in series with SCR 464 as above described.

In any event, the SCR 464 is caused by the reference potential appearing on the output terminal 331 of operational amplifier 329 to control the point in each half cycle at which current flow can begin through the workpiece. In this way, the average area under each current half wave through the workpiece and, hence, the heating effect, is determined. Thus, a shift of the point in the half wave at which current flow is initiated will have substantially the same effect as furnishing complete half waves of varying amplitude. The controlled current half waves in FIGURE 1F are thus indicated as full halfwaves of varying amplitude for convenience in illustration though it will be understood that variation of workpiece heating is here controlled by adjusting the phase at current flow initiation. When the weld current is begun after the 90° phase point in the half wave, retarding of the firing of SCR 464 reduces the amplitude of the current partial half wave through the workpiece and thereby the instantaneous amplitude of the envelope E (FIGURE 1F) in correspondence with the instantaneous amplitude of the reference signal R (FIGURE 1E).

At the beginning of the weld interval, a positive potential is applied by the memory unit 700, through the heat cool program unit if such is provided, to the input of weld interval trigger circuit 102 (FIGURE 3), more particularly to the base of transistor 114A thereof, for energizing said trigger circuit. As a result, the transistor 114A is turned on thus lowering the collector potential thereof and by means of the diode 154A clamping the line 156 substantially at the potential of common line 111. This drops the base potential on transistor 114 of initial heat trigger circuit 101 to de-energize such trigger circuit. In consequence, initial heat network 207 (FIGURE 4) is clamped and can no longer supply current through transistor 203 to capacitor 201. Also, the resulting conduction of transistor 118 of the initial heat trigger 101 causes diodes 133 and 134 to clamp the positive going and negative going ramp signal paths through the initial heat trigger circuit 101.

The ignition of transistor 114A provides a negative pulse through diode 124A, line 126 and resistor 236 (FIGURE 4) to one shot multivibrator 221 causing same to change state whereby the collector of transistor 223 thereof drops in potential. This potential drop is applied to the upper plate of capacitor 201 thus discharging same substantially to potential of common line 111. The afore-mentioned energization of weld interval trigger 102 turns off transistor 118A thereof to unclamp weld interval network 208 and the positive ramp and negative ramp paths through weld interval trigger 102. Unclamped network 208 provides current through constant current transistor 203 to charge the capacitor 201 at a gradual and constant rate so as to provide an increasing ramp potential on the upper plate thereof. This increasing ramp potential is applied through buffer circuit 247 and emitter follower 257 to increasing ramp line 239 and thence as the ramp signal P (FIGURE 1C) through the unclamped circuit comprising diodes 137A, 143A and 144A (FIGURE 3) to weld heat potentiometer 309 (FIGURE 5). Simultaneously, the increasing ramp signal is applied to the input of inverting operational amplifier 263 and appears at the output terminal 264 thereof as a decreasing ramp signal N (FIGURE 1B). This decreasing ramp signal N is applied by line 138 to the unclamped circuit including diodes 136A, 141A and 142A (FIGURE 3) associated with weld interval trigger 102 and thence by line 146 to the initial heat potentiometer 308 (FIGURE 5). Preselected fractions of the decreasing ramp signal N on potentiometer 308 and the increasing ramp signal P on potentiometer 309 are summed by resistors 321 and 322 and applied to operational amplifier 302, ultimately appearing at the output 331 of operational amplifier 329 in a summed condition as reference signal R of FIGURE 1E. If desired, for example, where the timer 10 may alternatively drive several differing weld heads, feedback may be applied via the resistance 336 to the input 328 of operational amplifier 329 to modify the amplitude of the reference signal R to suit the characteristics of the particular gun feeding welding current to the workpiece W.

It will be noted that the potentiometer 308 retains the same setting prior to and during the weld interval. Thus, since the amplitude displacements of ramp signals N and P are identical and are the same during each interval (although the slopes may differ between intervals), the potential applied by resistor 321 to the input 303 at the beginning of the weld interval will be the same as that applied to input 303 at the end of the initial heat interval. Thus, at the beginning of the weld interval, the reference signal R will change from a constant amplitude waveform to a sloped waveform (assuming the maximum amplitudes of the weld interval fractional ramp signals $N_f$ and $P_f$ to be different) at the beginning of the weld interval without amplitude discontinuity.

It will further be noted that the maximum amplitude $a_{Nf}$ of the decreasing fractional ramp signal $N_f$ selected by potentiometer 308 determines the initial amplitude of the sloped portion S of the reference signal R and that the maximum amplitude $a_{Pf}$ of the positive fractional ramp signal fraction $P_f$ selected by potentiometer 309 determines the final amplitude $a_{Pf}$ of the sloped portion S of reference signal R. Since the sloped portion S of reference signal R is the sum of the two linear ramps $N_f$ and $P_f$ the sloped portion S must be linear, the end points thereof having the fixed time coordinates of the ramps N and P and having fixed amplitude coordinates $a_{Nf}$ and $a_{Pf}$. In the particular embodiment shown, the maximum amplitude of the increasing fractional ramp $P_f$ is greater than the maximum amplitude of the fractional negative going ramp $N_f$ so that the slope S of the reference signal R resulting therefrom is positive. By making the amplitude $a_{Nf}$ greater than the amplitude $a_{Pf}$, the resulting slope S can, however, be made a negative one, the selection of the amplitude and polarity of such slope S being readily achieved by suitable adjustment of potentiometers 308 and 309.

As above described, the positive going slope S of the reference signal R is applied to the emitter of transistor 406 and by means of transistors 407 and 408 results in phase shifting of the firing point of SCR 464 toward the beginning of the half wave to gradually increase the heat applied to the workpiece W and in effect to increase the instantaneous amplitude of the weld current envelope P as indicated in FIGURE 1F.

The constant rate charging of capacitor 201 (FIGURE 4) terminates at a time determined by the setting of tap switches 216A and 217A, such time being indicated by the reference character $t_2$ in FIGURE 1, when the voltage on the upper plate thereof reaches the Zener voltage of Zener diode 242. This capacitor voltage remains constant throughout the rest of the weld interval whereby the positive going ramp signal P applied to potentiometer 309 (FIGURE 5) will be at its maximum value $a_P$ and the negative going ramp signal N will be at its minimum value, here zero. Thus, the amplitude envelope E stays at a constant level from time $t_2$ to time $t_3$, the end of the weld interval.

In the particular weld timer 10 shown, the weld interval is followed by a post-heat interval in which a reduced amount of current flows through the workpiece. More particularly, at the beginning of the post-heat interval, the weld current envelope E (FIGURE 1F) slopes downwardly in a continuous manner from its weld interval level to a lesser value at time $t_4$ and continues constant at this lesser value throughout the rest of the post-heat interval. Considering the post-heat interval in more detail, such is begun with the appearance of a positive potential, originating in the memory unit 700, on the line 152 (FIGURE 3). As discussed hereinabove with respect to the weld interval trigger 102, such positive potential energizes the post-heat trigger 103 throughout the post-heat interval. Simultaneously, the positive potential is removed from line 151 by the memory unit 700 to de-energize the weld interval trigger 102 thereby clamping the weld interval network 308 in the ramp generator unit 200 and the negative going ramp diode 136A and positive going ramp diode 137A to prevent ramp signals from passing through the weld interval trigger 102 to the voltage compensator unit 300.

The energized post-heat trigger 103 clamps the junction point 157 substantially at ground potential through diode 154B and now conductive transistor 114B and thereby assures that the base potential on transistor 114 will remain low, the initial heat trigger thereby remaining de-energized. Turning on of transistor 114B produces a pulse through capacitor 132B and diode 124B which is applied by line 126 and resistor 236 to the base of transistor 222 to render same momentarily nonconductive, thereby reversing the state of one shot multivibrator 121. As above described with respect to the weld interval, this results in the momentary conduction of transistor 223 to discharge capacitor 201 in preparation for generation of another ramp signal during the initial portion of the post heat interval.

The energization of post heat trigger 103 also unclamps line 128B. Thus, the transistor 203 conducts only the post heat network 209 at a constant rate determined by the setting of tap switches 216B and 217B to charge capacitor 201 over a predetermined number of cycles of the alternating current supply until maximum charge is reached as determined by the Zener breakdown voltage of Zener diode 242. As above described with respect to the weld interval, the rising voltage on the capacitor 201 results in an increasing ramp signal P' (FIGURE 1D) and a decreasing ramp signal N' (FIGURE 1C) which are applied to lines 139 and 138, respectively, and thence through diodes 137B and 136B, respectively, in the post heat trigger 103, through diode sets 143B, 144B and 141B, 142B to lines 161 and 159, respectively, and thereby to the post heat potentiometer 311 and weld heat potentiometer 309, none of the other potentiometers being energized. The potentiometers 309 and 311 apply fractional values $N'_f$ and $P'_f$ of the ramp signals N' and P' to the resistances 322 and 323. The resulting summed slope portion S' of the reference signal R appears at the output of operational amplifier 331 and is applied, as above discussed with respect to the weld interval, to the emitter of transistor 406 in the heat control unit 400 to regulate the conduction thereof and thereby to regulate the application of firing potential to the gate of SCR 464 and, thus, the phase point at which current flows through the workpiece W is initiated.

It will be noted that the initial amplitude of the sloped portion S' of the reference signal R is equal to the maximum amplitude of signal N'$_f$ which in turn is equal to the amplitude of the reference signal R at the end of the weld interval. Thus, the slope portion S' extends from the weld interval portion of the reference signal R without any discontinuity in amplitude. Further, the slope S' can be either positive or negative depending upon whether the maximum amplitude of positive going fractional ramp P'$_f$ is greater than or less than the maximum amplitude of the negative going fractional ramp N'$_f$, the slope S' in the particular embodiment shown being negative going. When the capacitor 202 reaches its maximum charge level as determined by Zener diode 202, the fractional negative going ramp N'$_f$ reaches its minimum or zero level and the fractional positive going ramp portion P'$_f$ reaches its maximum amplitude which determines the amplitude of the plateau portion following slope S'.

Further sloped portions, for example, corresponding to a temper period or the like may be applied to the workpiece current envelope E by use of the further trigger circuits 104 and 105, networks 211 and 212 and amplitude setting resistors 312 and 313 generally as above described with respect to the initial intervals of the timer 10.

Although a particular preferred embodiment of the invention has been described hereinabove for purposes of illustration, it will be understood that variations or modifications thereof which lie within the scope of the appended claims are fully contemplated.

The embodiments of the invention in which an exclusive property or privilege is claimed are defined as follows:

1. A method for generating a linear sloped signal having end points fixed in amplitude and time to which the pattern of heat applied to a workpiece in a resistance welding machine will be constrained, comprising the steps:
generating a first linear ramp signal, said first ramp signal being initiated at a preselected time and having a predetermined amplitude displacement;
generating a second linear ramp signal, the slope of which is opposite in sign to that of said first ramp, at least portions of said first and second ramp signals concurring in time;
adding said concurrent portions of said first and second ramp signals to provide a linear reference signal as the sum thereof and causing the rate of heat application to the workpiece to change with the reference signal.

2. The method defined in claim 1 in which the first and second ramp signals have essentially the same time coordinates and in which the rate of change of amplitude of the first ramp signal is identical in magnitude to that of the second ramp.

3. The method defined in claim 1 in which the second ramp is produced from the first ramp.

4. The method defined in claim 1 in which fractions of the first and second ramp signals, comprising positive going and negative going linear fractional ramp signals are obtained and wherein it is the fractional ramp signals which are added to provide the reference signal to produce an increasing reference signal when the positive fractional ramp signal is larger than the negative fractional ramp signal and a decreasing reference signal when the positive fractional ramp signal is less than the negative going fractional ramp signal.

5. A method for generating a reference signal corresponding to the desired envelope of the current waveform applied to a workpiece in a resistance welder, comprising the steps:
generating first linear, positive going and negative going ramp signals between initial and final end points having the same amplitude and time coordinates;
selecting a preselected amplitude fraction of each of said first ramp signals to produce first fractional positive going and negative going ramp signals;
adding said first fractional positive going and negative going ramp signals to obtain a first reference signal;
maintaining said first fractional ramp signals at their final end point amplitude after said final end point time has passed and to the end of a predetermined interval;
generating second linear positive going and negative going ramp signals identical to the first ramp signals at the end of said predetermined interval;
selecting fractional values of said second ramp signals to produce a second positive going fractional ramp signal and a second negative going fractional ramp signal, said negative going fractional ramp signal having an initial amplitude equal to the final amplitude of said first positive going fractional ramp;
adding said second positive going and negative going fractional ramp signals to give a second reference signal of initial amplitude equal to the final amplitude of said first reference signal;
varying the weld current envelope in correspondence with said first and second reference signals.

6. Apparatus for generating a reference signal corresponding to the desired envelope of current supplied to a workpiece in a resistance welding machine, comprising in combination:
means for generating first and second linear ramp signals, one of increasing amplitude and the other of decreasing amplitude, the initial and final amplitude and time coordinates of said ramps being predetermined;
an adding circuit and means for applying said ramp signals to said adding circuit, said adding circuit producing a linear reference signal output having end point time coordinates corresponding to those of said ramp signals, having an initial amplitude coordinate corresponding to initial amplitude coordinate of one of said ramp signals and a final amplitude coordinate corresponding to the final amplitude coordinate of the other of said ramp signals;
means for varying the current envelope applying to the workpiece in accordance with variations in said reference signal so as to provide a current envelope having fixed amplitude and time end points and a linear slope.

7. The apparatus defined in claim 6 including means disposed between said ramp generating means and said adding means adjustable for supplying predetermined amplitude fractions of said ramp signals to said adding means in the form of linear fractional ramps of the same time duration as said time signals but having lesser slopes.

8. The device in claim 6 in which said means for regulating the current flow through the workpiece in response to said reference signal includes a heat control unit and an alternating current supply for energizing said heat control unit, said heat control unit including means conductive at a point in each alternating current half cycle corresponding to the instantaneous amplitude of the reference signal and for causing corresponding conduction of current through the workpiece.

9. The device defined in claim 7 in which the ramp generating means includes a plurality of alternatively selectable networks set for determining the time interval of said ramps and including selecting means actuable for selecting which of said networks is to be energized for generating said ramps, said means for fractioning said ramp comprising a plurality of independently settable elements and means associated with said selecting means for applying said ramp signals to preselected ones of said elements to insure that the desired fractions of said ramp signals will be summed.

10. The apparatus defined in claim 9 in which said selecting means comprises a plurality of sequentially actuable trigger circuits and in which said trigger circuits are further connected for terminating previous ramp signals in said ramp generating means prior to generation of new ramp signals.

11. In a timer for a resistance welding machine capable of providing current flow through a workpiece, such current flow defining an envelope including a linearly sloped portion having fixed time and amplitude end point coordinates, the combination comprising:
sources of A.C. and D.C. potential;
a capacitor and a constant current source in series therewith for charging same from said D.C. source so as to generate a linear ramp signal of increasing amplitude;
means for generating a negative going ramp signal from said positive going ramp signal identical in amplitude displacement to said positive going ramp signal;
at least a pair of potentiometers and means applying said positive and negative going ramp signals to corresponding ones of said potentiometers, said potentiometers having armatures actuable for selecting a fraction of the signals impressed upon said potentiometers;
a summing device comprising operational amplifier means and resistances connecting the armatures of said potentiometers to the input of said operational amplifier means for providing a reference signal comprising the sum of the fractional ramp signals at the output of said operational amplifier means;
means responsive to said sum signal for controlling the point in each half wave of the A.C. source at which current flow begins through the workpiece.

12. The device defined in claim 11 in which said constant current source comprises an adjustable resistance and a transistor having its emitter and collector connected in series with said capacitor and said adjustable resistance means across said D.C. source;
a voltage divider connected across said D.C. source, the base of said transistor being connected to an intermediate point on a voltage divider for maintaining current flow through the emitter-collector path of said transistor constant despite variations in the charge level of the capacitor; and
a Zener diode and means connecting same across said capacitor to limit the maximum charge thereon to a preselected maximum level.

13. The device defined in claim 11 including a buffer circuit energized by the potential on said capacitor and an emitter-follower circuit driven by said buffer and providing said positive blowing ramp signal on the emitter thereof.

14. The device defined in claim 11 in which said negative going ramp signal generating means comprises a phase inverting operational amplifier fed with said increasing ramp signal for providing a negative going ramp signal at the output thereof, said operational amplifier having a negative feedback loop from the output to the input thereof for maintaining the gain thereof substantially at unity and having adjustable input bias means adjustable for varying the amplitude of the input signal thereto.

15. The device defined in claim 11 including a one-shot multivibrator and means connecting the output thereof across said capacitor for discharging same to a predetermined low level.

16. The device defined in claim 11 including a plurality of trigger circuits and means for timing a plurality of successive time intervals and for energizing successive ones of said trigger circuits at the beginning of successive corresponding time intervals.

17. The device defined in claim 16 in which said constant current source includes a plurality of parallel networks in series with said capacitor across said D.C. source, at least some of said networks including adjustable resistance means settable for determining preselected levels of charging current through the capacitor and including means connecting said networks individually to corresponding ones of said trigger circuits for clamping each network in a state of nonconduction through said capacitor when the corresponding trigger circuit is de-energized and for allowing conduction of said network through said capacitor when the corresponding trigger circuit is energized.

18. The device defined in claim 16 including means responsive to energization of any of said trigger circuits for momentarily discharging said capacitor.

19. The device defined in claim 16 in which at least one of said trigger circuits is provided with bias means connected across said D.C. source for normally maintaining said one trigger circuit energized and in which the remaining ones of said trigger circuit are provided with clamp means responsive to energization thereof for clamping the input to said one trigger circuit at a level below that required for energization thereof.

20. The device defined in claim 16 in which said ramp-applying means comprise a plurality of sets of gate circuits, each of said sets being associated with a corresponding one of said trigger circuits, said gate circuits including clamp means actuable upon de-energization of the associated trigger circuit for clamping said gate circuits in a nonconductive condition, said set of gate circuits for each trigger circuit comprising a pair of paths, one said path being connected to said means for generating said increasing ramp signal and the other path being connected to said means for generating said negative going ramp signal, said paths also being connected to corresponding ones of said potentiometers for applying said positive or negative ramp signals thereto.

21. The device defined in claim 11 in which said operational amplifier means of said summing device comprise a pair of inverting operational amplifiers connected in series and including feedback means connected around at least one of said operational amplifiers for matching the reference signal output thereof to the characteristics of the particular weld head used with the resistance welding machine.

22. The device defined in claim 11 in which said means controlling the current flow through the workpiece comprises a heat control circuit including sawtooth wave generating means energized from said A.C. source and means responsive to said sawtooth signal and said reference signal for initiating current flow through the workpiece, said responsive means being arranged so that an increase in the reference signal amplitude provides for initiation of workpiece current flow at an earlier phase point.

23. The device defined in claim 11 including means for gating the positive and negative going ramp signal to said potentiometers, said gating means comprising a plurality of pairs of gating paths, each of said pairs of paths corresponding to a successive one of a plurality of time intervals, one path of each pair carrying the positive going ramp signal and the other path carrying the negative going ramp signal, the positive going gate path of one set connecting to the same potentiometer as the negative going gate path of the next set whereby the reference signal goes from one time interval to the next without amplitude discontinuity.

24. The method defined in claim 1 in which one of said ramp signals is generated by varying the charge on charge accumulating means at a constant rate and maintaining said ramp signal constantly proportional to said charge.

25. The method defined in claim 24 in which the other of said ramp signals is generated from said one ramp signal by monitoring same and producing a signal reversed in polarity therefrom but otherwise at least substantially corresponding thereto.

References Cited

UNITED STATES PATENTS

| | | | |
|---|---|---|---|
| 2,590,582 | 3/1952 | Stadum et al. | 219—114 |
| 2,711,506 | 6/1955 | Johnsen et al. | 323—18 |
| 2,739,281 | 3/1956 | Rockafellow | 323—18 |
| 2,892,148 | 6/1959 | Large et al. | 323—89 |
| 3,267,382 | 8/1966 | Adem | 328—72 |

JOSEPH V. TRUHE, Primary Examiner

J. G. SMITH, Assistant Examiner

U.S. Cl. X.R.

219—114